United States Patent
Ke et al.

(10) Patent No.: US 12,389,239 B2
(45) Date of Patent: Aug. 12, 2025

(54) METHOD FOR UPLINK COMMUNICATION, RADIO ACCESS NETWORK AND RAN SYSTEM

(71) Applicant: Alpha Networks Inc., Hsinchu (TW)

(72) Inventors: Tzu-Chung Ke, Hsinchu (TW); Yan-Ciao Jao, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 455 days.

(21) Appl. No.: 18/093,417

(22) Filed: Jan. 5, 2023

(65) Prior Publication Data

US 2023/0262481 A1    Aug. 17, 2023

(30) Foreign Application Priority Data

Feb. 11, 2022 (TW) ................... 111105037

(51) Int. Cl.
| | | |
|---|---|---|
| *H04W 16/28* | (2009.01) | |
| *H04B 7/06* | (2006.01) | |
| *H04L 1/20* | (2006.01) | |
| *H04W 76/10* | (2018.01) | |
| *H04W 88/08* | (2009.01) | |

(52) U.S. Cl.
CPC .......... *H04W 16/28* (2013.01); *H04B 7/0617* (2013.01); *H04L 1/203* (2013.01); *H04W 76/10* (2018.02); *H04W 88/085* (2013.01)

(58) Field of Classification Search
CPC ... H04W 16/28; H04W 76/10; H04W 88/085; H04L 1/203; H04B 7/0617
See application file for complete search history.

(56) References Cited

U.S. PATENT DOCUMENTS

| | | | |
|---|---|---|---|
| 2009/0316756 A1* | 12/2009 | Ro | H04B 7/0684 |
| | | | 375/E1.033 |
| 2017/0033899 A1 | 2/2017 | Rakib et al. | |
| 2018/0076515 A1 | 3/2018 | Perlman et al. | |
| 2018/0294839 A1* | 10/2018 | Bogdan | H04L 43/16 |
| 2020/0313738 A1* | 10/2020 | Iyer | H04B 7/10 |

(Continued)

FOREIGN PATENT DOCUMENTS

| | | |
|---|---|---|
| CN | 101861718 B | 10/2010 |
| EP | 3869847 A1 | 8/2021 |

OTHER PUBLICATIONS

Search Report appended to an Office Action, which was issued to Taiwanese counterpart application No. 111105037 by the TIPO on Aug. 9, 2022, with an English translation thereof.

*Primary Examiner* — Michael K Phillips
(74) *Attorney, Agent, or Firm* — Blank Rome LLP (57) ABSTRACT

A method for uplink communication to be executed by a RAN includes: for each of UEs, establishing connection with one of RUs; host device conducting data transmission with each UE in multiple phase delays through controlling the beamforming antenna of the UE via the RU that is connected to the UE, and calculating an error rate with respect to each of the phase delays; the host device finding one of the phase delays that has the lowest error rate and setting a configuration of beamforming antenna of the UE with the phase delay that has the lowest error rate, such that the UE and the RU connected thereto form a spatially isolated relationship; and within the spatially isolated relationship, the RU receiving uplink data from the UE and transmitting the uplink data to the host device.

13 Claims, 6 Drawing Sheets

(56) References Cited

U.S. PATENT DOCUMENTS

| | | | | |
|---|---|---|---|---|
| 2022/0400532 A1* | 12/2022 | Kalkunte | ............... | H04W 72/21 |
| 2023/0239027 A1* | 7/2023 | Girycki | ................. | H04L 5/0035 |
| 2024/0314015 A1* | 9/2024 | Nakayama | ........ | H04W 72/0446 |

* cited by examiner

METHOD FOR UPLINK COMMUNICATION, RADIO ACCESS NETWORK AND RAN SYSTEM

CROSS-REFERENCE TO RELATED APPLICATION

This application claims priority to Taiwanese Invention Patent Application No. 111105037, filed on Feb. 11, 2022.

FIELD

This invention relates to a radio access network, and a related system and method.

BACKGROUND

An intelligent or smart factory (intelligent manufacturing) generally refers to a manufacturing plant that captures real-time information during manufacturing and/or testing, and performs monitoring, analysis, even application of artificial intelligence for abnormality determination, fault prediction, and so forth, using the captured information.

In the processes described above, the real-time information is collected through multiple pieces of equipment such as cameras, sensors, etc., which are generally referred to as user equipment (abbreviated as UE), and is transmitted to the core network (abbreviated as CN) by a radio access network (abbreviated as RAN).

Figure 1:
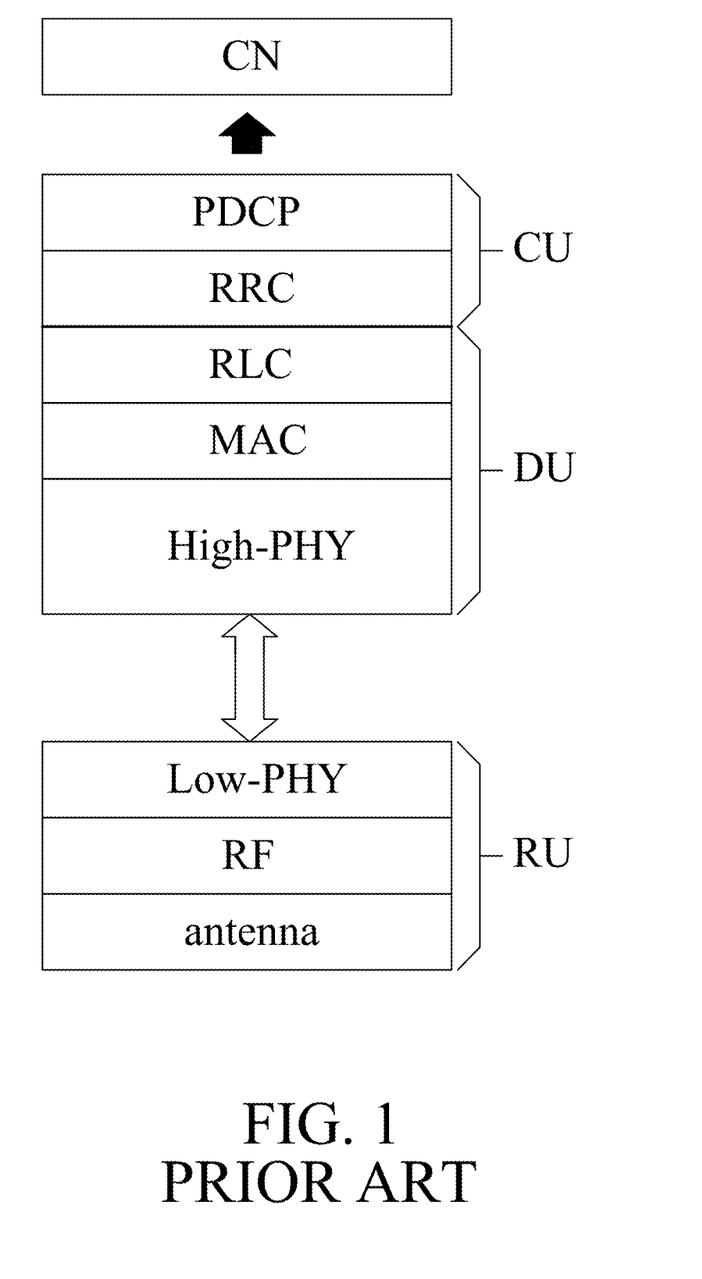
FIG. 1 is a block diagram illustrating an existing radio access network telecommunications architecture.

Referring to FIG. 1, in the case of an Open Radio Access Network (Open RAN, abbreviated as O-RAN) telecommunications architecture, a 5G base station is divided into a central unit (abbreviated as CU), a distributed unit (abbreviated as DU) and a radio unit (RU). The RU includes a low physical (low-PHY) layer and hardware related to transmitting radio-frequency signals, so as to communicate with the UE through radio waves. The DU is responsible for radio link control (abbreviated as RLC), Medium Access Control (MAC) and High Physical (high-PHY) Layer, and conducts data transmission with the RU through evolved Common Public Radio Interface (abbreviated as eCPRI) of Ethernet. The CU is responsible for Packet Data Convergence Protocol (abbreviated as PDCP), and Radio Resource Control (abbreviated as RRC). The CU is configured to connect to and manage the DU through, for example, a 5G Femto Application Platform Interface (abbreviated as), and transmits data with the CN through a Next Generation (abbreviated as NG) interface.

Currently, a way to establish connection between an UE and an RU is to preset the power level of transmission to the highest when the UE is powered on, to ensure that the RU can be scanned and connected. However, in this manner, the UE will be communicatively connected with not only the nearest RU but also other RUs that the transmitted signals can reach. Under these circumstances, the Use's reception of signals from the nearest RU would be interfered with by the other RUs, and the uplink signals transmitted by the UE would interfere with other RUs as well. Taking the uplink as an example, under a situation where there is interference to the UE transmitting signals, the efficiency of the band usage would be affected, and unwanted power consumption of the UE would arise because the power of the transmitted signals would need to be tuned to be stronger than interfering signals.

Furthermore, the cost of acquiring spectrum of the 5G business network (local 5G network or private 5G network) for the smart factory is quite high, regardless of whether it is dedicated spectrum or shared spectrum. Consequently the need to increase spectrum utilization without signal interference is a major challenge for the industry when introducing related technologies.

SUMMARY

Therefore, an object of the disclosure is to provide a method of uplink communication in a radio access network (RAN) that can alleviate at least one of the drawbacks of the prior art.

According to the disclosure, the method for uplink communication is to be executed by a RAN. The RAN is communicatively connected with a plurality of user equipments (UEs) that have beamforming antennas, and including a plurality of radio units (RUs) for data exchange with the UEs, and a host device for communication with the RUs. The host device includes a distributed unit (DU) having a plurality of high-physical (high-PHY) layers configured to be connected with the RUs, respectively, and a central unit (CU) configured to connect to and manage the DU (2). The method includes the following steps.

In a step, each of the UEs establishes connection with one of the RUs.

In another step, with respect to each of the UEs, the host device conducts data transmission with the UE in multiple phase delays through controlling the beamforming antenna of the UE via one of the RUs that is connected to the UE, and calculates an error rate with respect to each of the phase delays.

In yet another step, the host device finds, with respect to each of the UEs, one of the phase delays that has the lowest error rate.

In still another step, with respect to each of the UEs, the host device sets, through controlling the UE via said one of the RUs that is connected thereto, a configuration of the beamforming antenna of the UE with the phase delay that has the lowest error rate, such that the UE and said one of the RUs connected thereto form a spatially isolated relationship, and within the spatially isolated relationship, said one of the RUs receives uplink data from the UE and transmits the uplink data to the host device, with the RU receiving and transmitting the uplink data from the UE, one of the high-PHY layers of the DU that is connected to the RUs receiving the uplink data and performing decoding on the uplink data thus received, and the DU transmitting the uplink data thus decoded to the CU.

Another object of the disclosure is to provide a radio access network (RAN) for communicative connection with a plurality of UEs that have beamforming antennas.

According to the disclosure, the RAN is for communicative connection with a plurality of UEs that have beamforming antennas. The RAN includes a plurality of RUs for connecting with the UEs, and a host device for communicative connection with the RUs. The host device includes a DU having a plurality of high-PHY layers configured to be connected with the RUs, respectively, and a CU configured to connect to and manage the DU.

With respect to each of the UEs, the host device determines which one of the RUs the UE is to be connected with, and sets, through controlling the UE via one of said RUs that is connected thereto, a configuration of the beamforming antenna of the UE with a specific phase delay, such that the UE and said one of the RUs that is connected thereto form a spatially isolated relationship.

The specific phase delay is determined by the host device by calculating and finding a lowest error rate of data transmissions.

Each of the RUs receives uplink data from the UE(s) connected thereto and transmits the uplink data to the respective one of the high-PHY layer of the DU, the respective one of the high-PHY layers performs decoding on the uplink data, and the DU transmits the uplink data thus decoded to the CU.

Yet another object of the disclosure is to provide a RAN system.

According to the disclosure, the RAN system includes the RAN described above, and a plurality of UEs having beamforming antennas.

The advantages of the present invention reside in the following: the direction of signal transmission of the antenna of the UE is controlled in digital ways to form a spatially isolated relationship with the RU, so as to optimize the uplink throughputs in a fixed bandwidth and increase spectrum utilization.

BRIEF DESCRIPTION OF THE DRAWINGS

Other features and effects related to the disclosure will be clearly presented in the embodiment(s) with reference to the drawings, in which.

DETAILED DESCRIPTION

Before the present disclosure is described in detail, it should be noted that like elements are denoted by the same reference numerals in the following description. Techniques disclosed herein relate to data transmission in wireless networks. The wireless networks are according to, for example, 5th Generation Wireless System (5G) technology and/or standards, or a different version of wireless system technologies and/or standards such as the deviations, the previous generations (including 3GPP, LTE, LTE-A, WiMAX-A and 4G), and the later generations.

In this embodiment, the wireless network is illustrated by the adoption of the Open Radio Access Network (abbreviated as O-RAN) telecommunications architecture into the 5G network system as an example, and is applied to a smart factory. In some embodiments, the wireless network may additionally or alternatively use other network systems or telecommunications architectures. The present disclosure is not limited to these examples.

Figure 2:
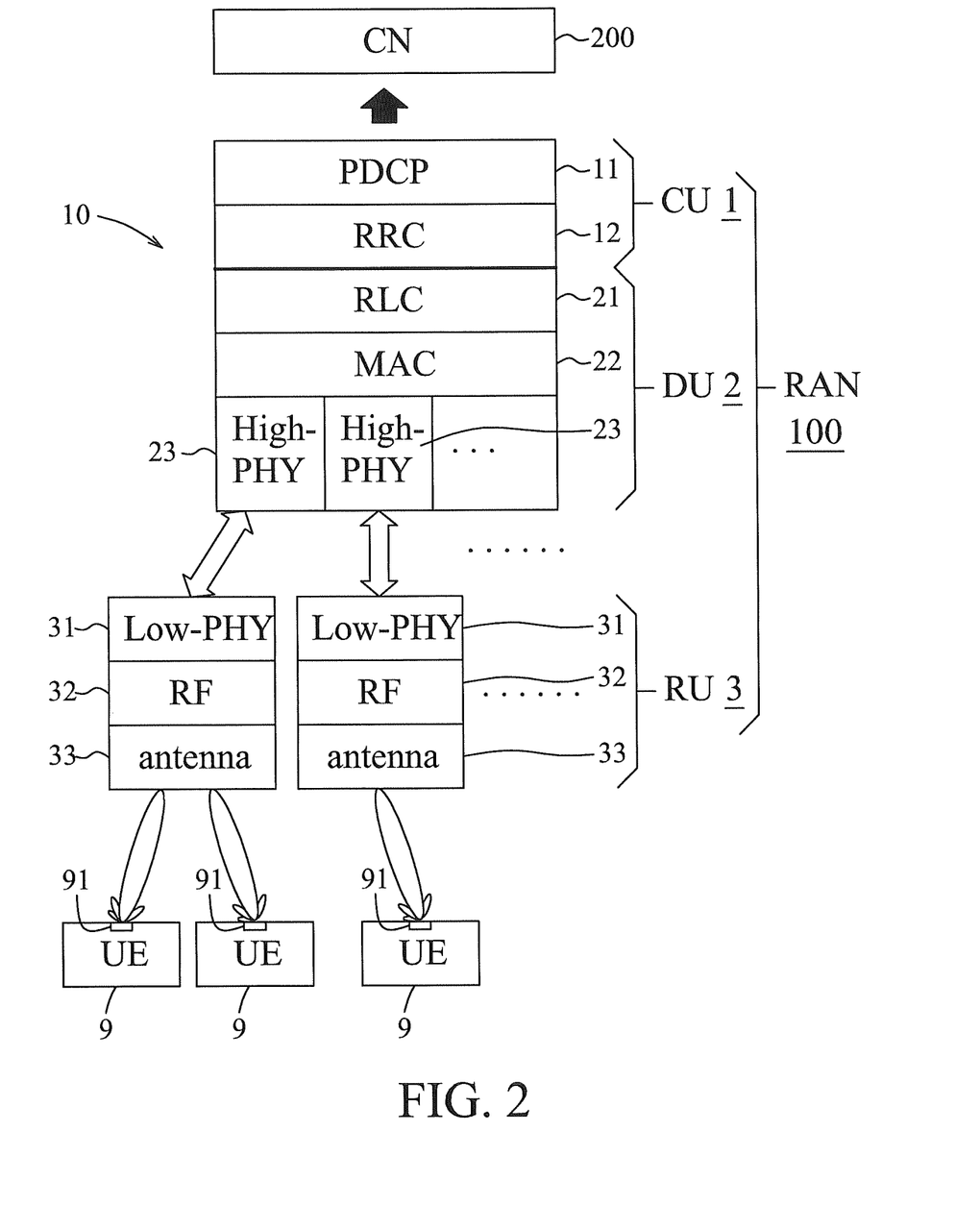
FIG. 2 is a block diagram illustrating an architecture of an embodiment of a radio access network system of the disclosure.

Referring to FIG. 2, an embodiment of a radio access network system of the present disclosure includes a radio access network (RAN 100) and a plurality of user equipments (UEs 9) with beamforming antennas 91. The RAN 100 includes a central unit (CU) 1, a distributed unit (DU) 2, and a plurality of radio units (RUs) 3.

In this embodiment, the CU 1 and the DU 2 are integrated into a host device 10, which can be placed at a local end or a remote end of the smart factory. The CU 1 includes a Packet Data Convergence Protocol (PDCP) layer 11 responsible for Packet Data Convergence Protocol, and a Radio Resource Control (RRC) layer 12 responsible for radio resource control. The CU 1 is configured to connect to and manage the DU 2 through, for example, a 5G Femto Application Platform Interface (abbreviated as FAPI), and conducts data transmission with a core network (abbreviated as CN) 200 through a next generation (abbreviated as NG) interface. The DU 2 includes a Radio link control (RLC) layer 21 responsible for radio link control, a Medium Access Control (MAC) layer 22 responsible for medium access control, and a plurality of high physical (high-PHY) layers 23. Data transmission between the DU 2 and the RUs 3 is conducted through the evolved Common Public Radio Interface (abbreviated as eCPRI) of the Ethernet network.

The RUs 3 are distributed separately from one another in the smart factory, for example but not limited thereto, one RU 3 in each room, or one RU 3 on each floor. In this embodiment, each RU 3 includes a low physical (low-PHY) layer 31 for connecting with the high-PHY layer 23 of the DU 2, a radio frequency (RF) module 32, and an antenna 33 for connecting with the UE 9 via radio waves. It should be noted that in some embodiments, the RUs 3 may differ in type, and the equipped numbers of the low-PHY layer 31, the RF module 32, and the antenna 33 are not limited to what are disclosed herein.

In this embodiment, the UEs 9 are wireless communication devices having sensors and are disposed on or near one or more machines in the smart factory. For example, each of the UEs can be a smartphone, a tablet, a notebook, or a network camera (WebCam), a monitoring camera, an infrared sensor (IR sensor), a pressure sensor, etc. In this embodiment, the UEs 9 all have beamforming antennas 91 for communicative connection with the RUs 3.

Figure 3:
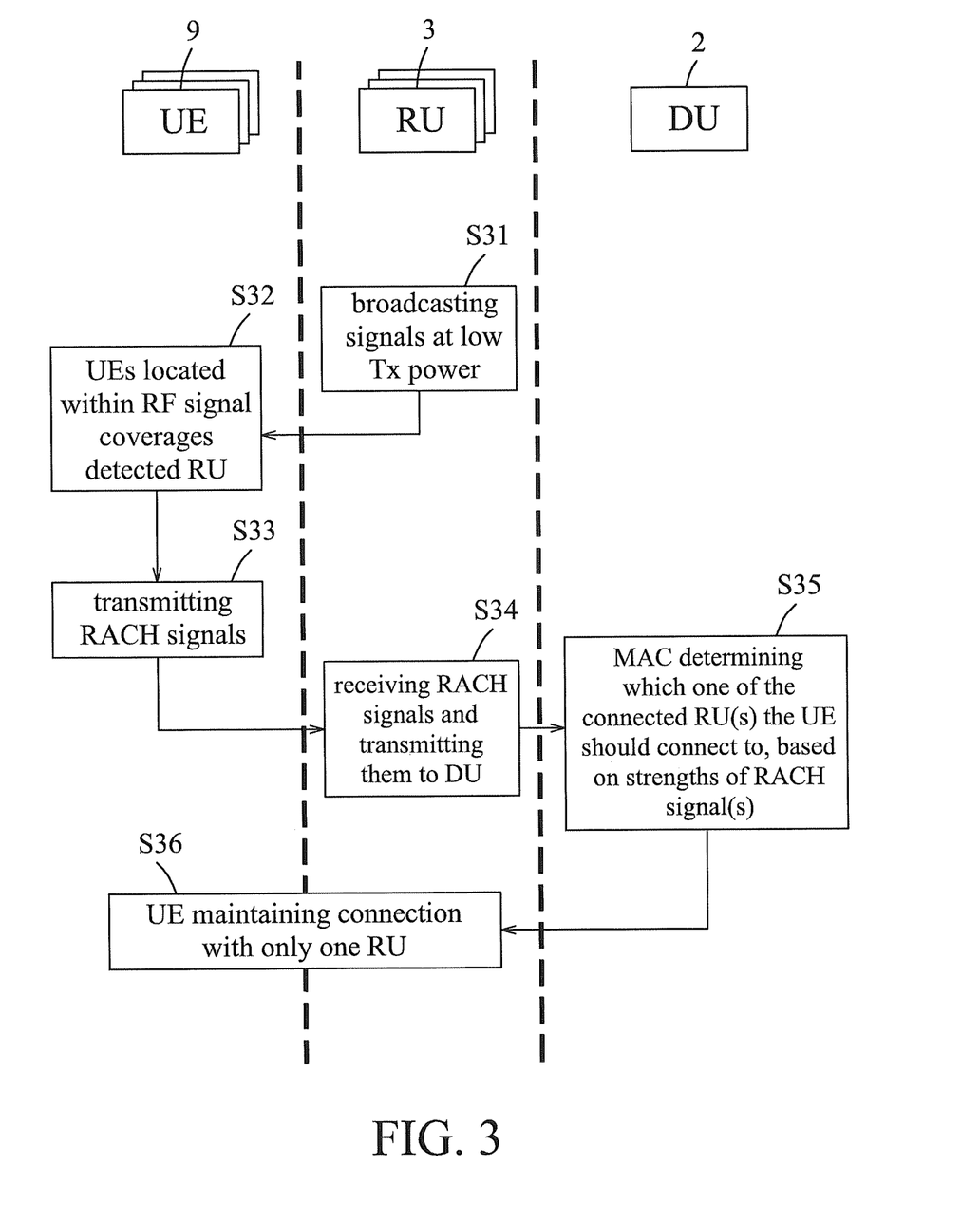
FIGS. 3 to 5 are flow charts illustrating steps of an embodiment of a method of uplink in a radio access network according to the present disclosure.
Figure 4:
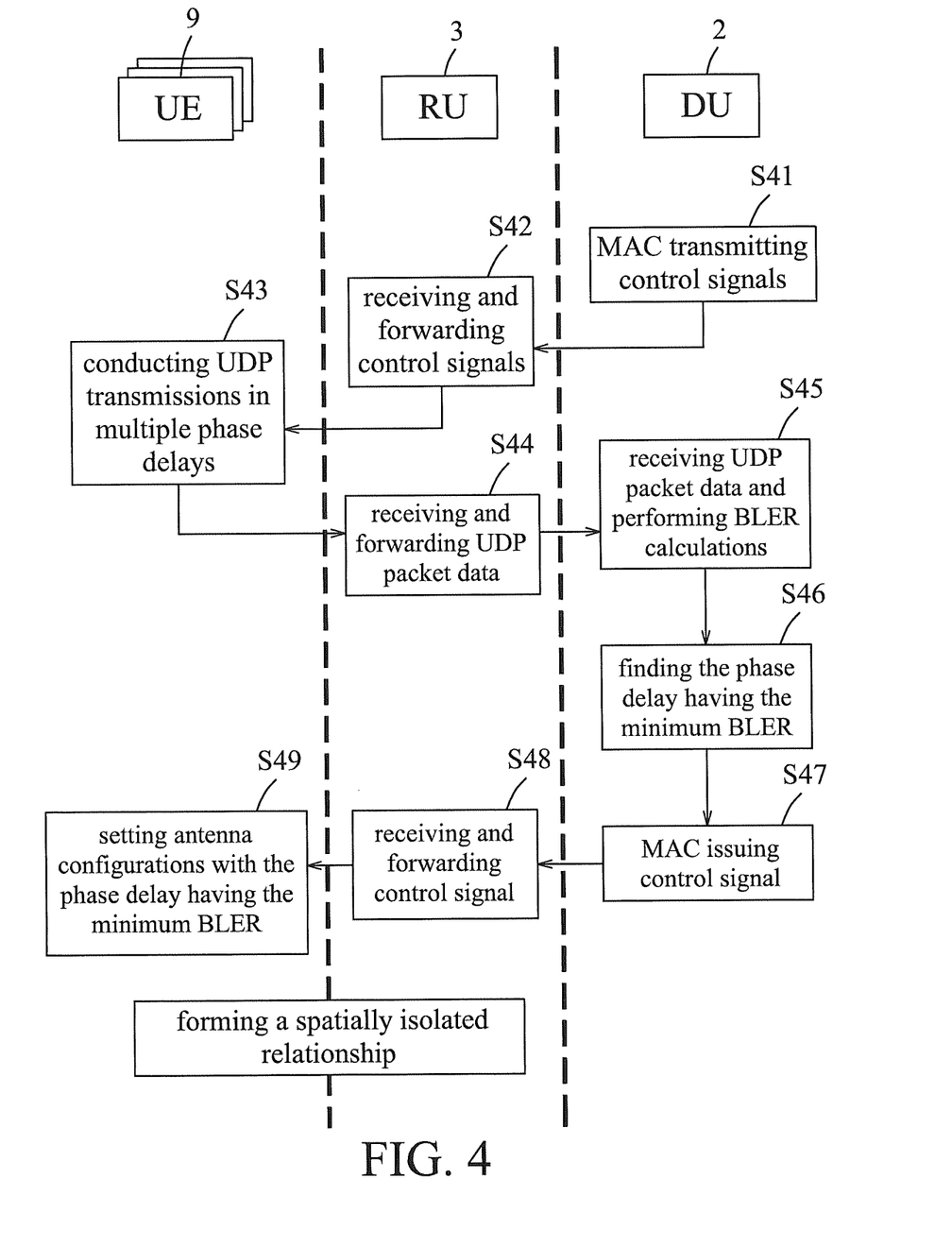
Figure 5:
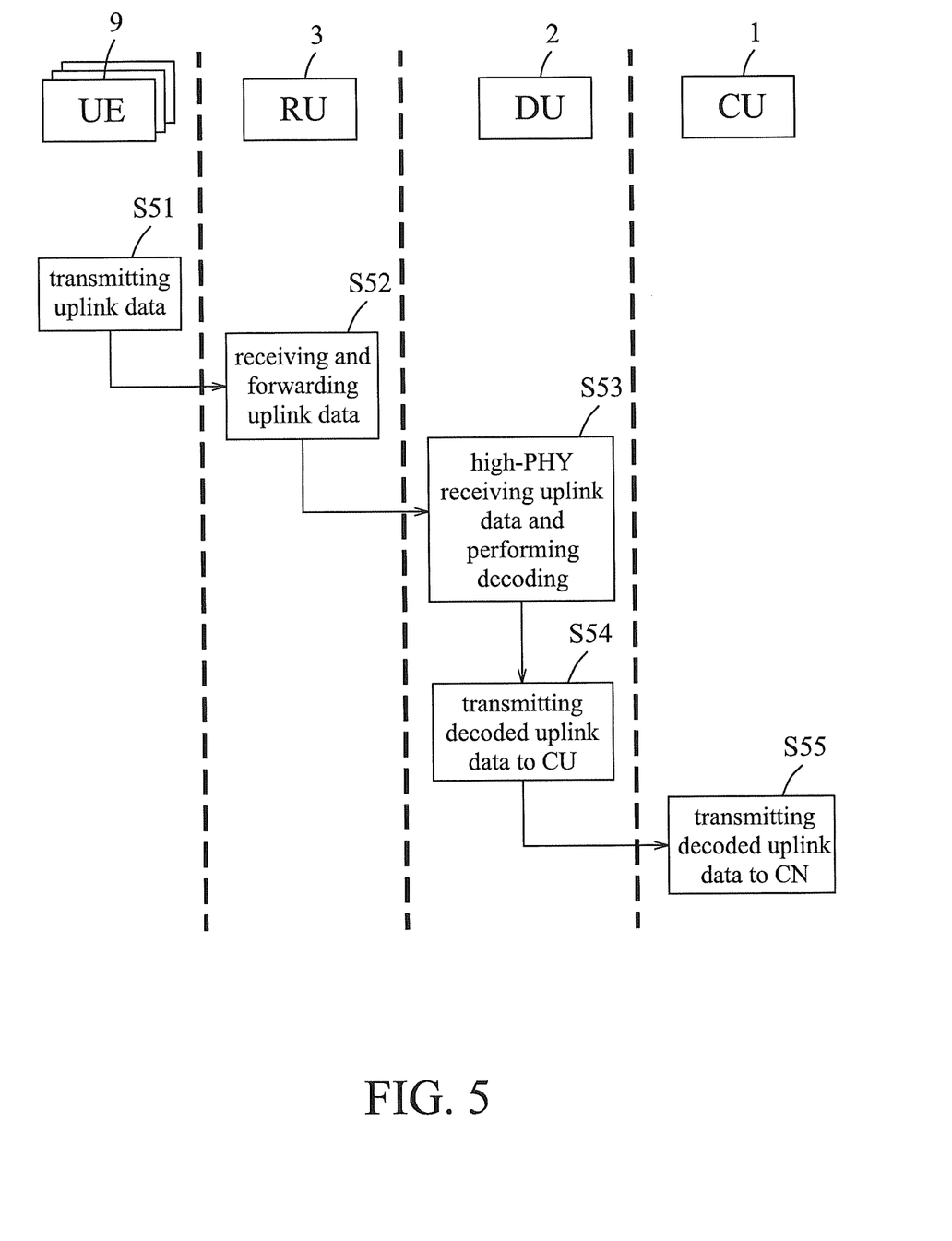

Referring to FIGS. 3 to 5, an embodiment of a method for uplink communication of a radio access network includes the following steps. When the UEs 9 in the smart factory are powered on, steps S31 to S36 are performed to establish connections between the UEs and the RUs, as shown in FIG. 3. When each of the UEs 9 has established connection with one of the RUs 3, steps S41 to S49 are performed to form a spatially isolated relationship between the UE and said one of the RUs, as shown in FIG. 4. When each of the UEs 9 has formed the spatially isolated relationship with the single RU 3 that is connected thereto, steps S51 to S55 are performed to transmit uplink data, as shown in FIG. 5.

In step S31, the RUs 3 are activated, for example, by the host device 10, to transmit broadcast signals at low transmit power (Tx power), thereby generating small radio frequency signal coverages. If any of the UEs 9 that are powered on is located within one of the small radio frequency signal coverages, then the UE 9 can detect the RU 3 that generated said small radio frequency signal coverage, and the connection between the UE 9 and the RU 3 can be established (step S32). The RUs 3, being activated by the host device 10 again, may then transmit broadcast signals at higher transmit power to generate larger radio frequency signal coverages. Each of those of the UEs 9 that originally could not detect any RU 3 would potentially be located within one of the larger radio frequency signal coverages now, and thus connection between the UE 9 and the RU 3 that corresponds to the larger radio frequency signal coverage within which the UE 9 is located can be established. In accordance with this mechanism, the UEs 9 would establish connections with RUs 3 that are within a closer range of the UEs 9 earlier than other RUs 3.

In step S33, for any UE 9 that is connected with one or more RUs 3, the UE 9 starts transmitting random access channel (RACH) signals, through the RU(s) 3 connected thereto, to the host device 10 of the RAN 100 for performing a channel request, and each of the RU(s) 3 receives the RACH signals and transmits them to the DU 2 (step S34).

In step S35, the DU 2 receives the RACH signals from the UEs 9 through the corresponding RUs 3 connected thereto. With respect to each of the UEs 9, the MAC 22 of the DU 2 determines which one of the connected RU(s) 3 the UE 9 should connect to, based on the signal strengths of the RACH signal(s), and gives a command to establish a connection between the RU 3 thus determined and the UE 9. The UE 9 thus maintains connection with only one RU 3, the RACH signals transmitted through which were found to be the strongest (step S36). To elaborate, during the aforementioned steps S31 to S34, each of the UEs 9 may establish temporary connection with one or more RUs 3, and after steps S35 and S36, a sole RU connection is confirmed for each UE 9. It should be noted that each UE 9 is connected to only one RU 3, whereas each RU 3 can connect to one or more UEs 9.

Referring also to FIG. 2 and FIG. 4, in step S41, the MAC 22 of the DU 2 of the host device 10 transmits control signals to the UEs 9 through the RUs 3 connected thereto (S42) to trigger the beamforming antennas 91 of the UEs 9 to conduct user datagram protocol (UDP) transmissions in multiple phase delays, respectively. In the present embodiment, each of the UEs 9 receives the control signals, digitally adjusts the phase delays, and streams UDP packet data under the multiple phase delays (step S43).

The UDP packet data are transmitted to the DU 2 through the RUs 3 (step S44), for the DU 2 to perform block error rate (abbreviated as BLER) calculations (step S45) on the received UDP packet data, i.e., to calculate the percentage of error blocks (consecutive bits) out of the total number of blocks in all transmissions. To elaborate, a plurality of blocks are transmitted by each UE 9 to the DU 2 for each phase delay, and for each block, a cyclic redundancy check (abbreviated as CRC) code calculated according to the block is attached thereto. After receiving the block, the DU 2 also calculates a CRC code and compares it with the received CRC code. If the two CRC codes are identical, the transmission is error-free; if not, the transmission is recorded as an error. In step S45, the DU 2 calculates the percentage of error blocks for each of the UEs 9 in each of the multiple phase delays.

In step S46, with respect to each UE 9, the MAC 22 of the DU 2 then compares the BLERs under all phase delays for the UE 9, finds the phase delay having the minimum BLER, and issues a control signal to the UE 9 according to the phase delay with the minimum BLER (step S47). The control signal, through the RU 3, commands the UE 9 to set antenna configurations with the phase delay having the minimum BLER (steps S48 and S49). Thus, the beamforming antenna 91 of each of the UEs 9 is digitally tuned (through phase delay) to form a spatially isolated relationship with the connected RU 3, allowing the radio waves to be transmitted in a specific direction.

Referring to FIGS. 2 and 5, in step S51, each UE 9 transmits uplink data to the connected RU 3 within the spatially isolated relationship.

In step S52, the RU 3 receives and forwards the uplink data within the spatially isolated relationship.

In step S53, one of the high-PHY layers 23 of the DU 2 corresponding to the RU 3 receives the uplink data from the RU 3, and performs decoding. It is worth noting that the DU 2 of this embodiment is equipped with a plurality of high-PHY layers 23 to connect with the RUs 3, respectively, and each high-PHY layer 23 can individually decode uplink data, and then transmit decoded uplink data to the same MAC 22 and RLC 21 to achieve high efficiency processing, without requiring multiple host devices 10.

Figure 6:
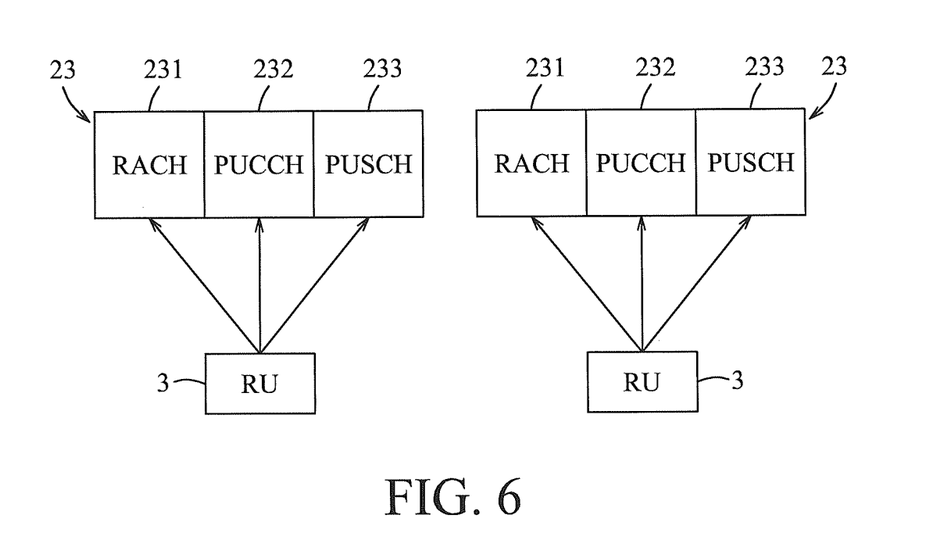
FIGS. 6 and 7 are block diagrams illustrating structures of high-PHY layers.

Specifically, referring to FIG. 6, each of the high-PHY layers 23 may have a random access channel (RACH) 231, a physical uplink control channel (PUCCH) 232, and a physical uplink shared channel (PUSCH) 233 for uplink communication. The RACH 231 is used to achieve uplink synchronization and to obtain resource for messages such as RRC connection requests. The PUCCH 232 is used to carry the uplink control information (UCI) with the channel state information (CSI) reports, and the scheduling requests (SR), etc. The PUSCH 233 is used to receive the uplink data from the RU 3, carry the uplink data, perform decoding, and transmit decoded uplink data to the same MAC 22 and RLC 21.

Figure 7:
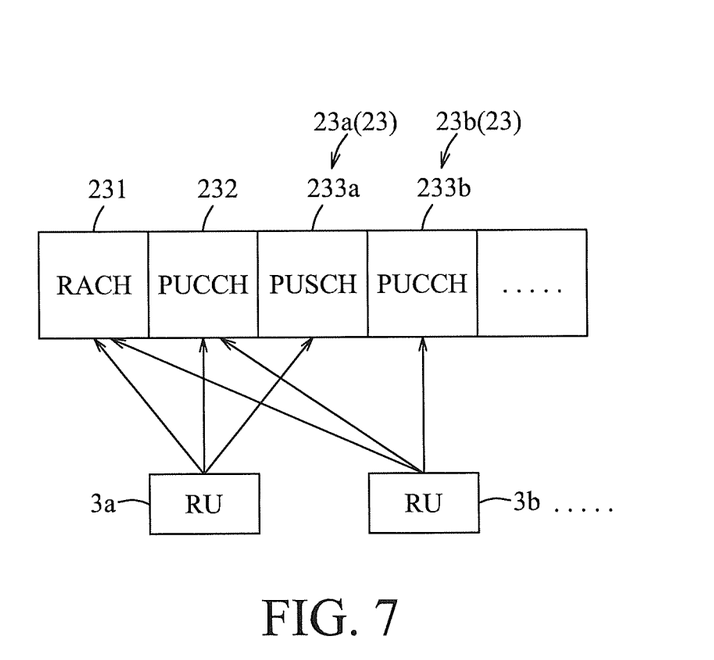

It is noted that the implementation of the high-PHY layers 23 is not limited to the architecture shown in FIG. 6. Referring to FIG. 7, in another embodiment, the high-PHY layers 23 are implemented in a combined architecture. That is to say, these high-PHY layers 23 have a common RACH 231 and a common PUCCH 232; and each of the high-PHY layers 23 has a respective PUSCH 233. For example, a first high-PHY layer 23*a* has a first PUSCH 233*a*, and a second high-PHY layer 23*b* has a second PUSCH 233*b*, so on and so forth.

In step S54, the DU 2 transmits the decoded uplink data to the CU 1.

In step S55, the CU 1 transmits the decoded uplink data to the CN 200.

As described, when each of the UEs 9 and its connected RU 3 form a spatially isolated relationship, it can significantly reduce the signal interference phenomena from other RUs 3. Each of the UEs 9 transmits uplink data only to it's designatedly connected RU 3 and will not interfere with other RUs 3. In this case, regardless of how many RUs 3 are present, the MAC 22 of the DU 2 of the host device 10 can control the RUs 3 to simultaneously receive uplink data from their correspondingly connected UEs 9 without worrying about interference issue, and the uplink throughputs can increase proportionally with increasing number of RUs 3, thereby achieving the purpose of uplink throughput optimization within the same bandwidth.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for uplink communication to be executed by a radio access network (RAN), the RAN being communicatively connected with a plurality of user equipments (UEs) that have beamforming antennas, and including a plurality of radio units (RUs) for data exchange with the UEs, and a host device for communication with the RUs, the host device including a distributed unit (DU) having a plurality of high-physical (high-PHY) layers configured to be connected with the RUs, respectively, and a central unit (CU) configured to connect to and manage the DU, said method comprising steps of:
    for each of the UEs, establishing connection with one of the RUs;
    with respect to each of the UEs, the host device conducting data transmission with the UE in multiple phase delays through controlling the beamforming antenna of the UE via one of the RUs that is connected to the UE, and calculating an error rate with respect to each of the phase delays;
    the host device finding, with respect to each of the UEs, one of the phase delays that has the lowest error rate;
    with respect to each of the UEs, the host device setting, through controlling the UE via said one of the RUs that is connected thereto, a configuration of the beamforming antenna of the UE with the phase delay that has the lowest error rate, such that the UE and said one of the RUs connected thereto form a spatially isolated relationship; and
    within the spatially isolated relationship, said one of the RUs receiving uplink data from the UE and transmitting the uplink data to the host device, including
    said one of the RUs receiving and transmitting the uplink data from the UE,
    one of the high-PHY layers of the DU that is connected to said one of the RUs receiving the uplink data from said one of the RUs and performing decoding on the uplink data thus received, and
    the DU transmitting the uplink data thus decoded to the CU.

2. The method of claim 1, wherein the step of, for each of the UEs, establishing connection with one of the RUs includes:
    establishing connections between the RUs and the UEs; and with respect to each of the UEs, the host device receiving random access channel (RACH) signals from the UE through one or more of the RUs that are connected to the UE,
    the host device determining said one of the RUs that the UE is to be connected with, according to signal strengths of the RACH signals, and said one of the RUs establishing connection with the UE.

3. The method as claimed in claim 2, wherein the step of establishing connections between the RUs and the UEs includes: each of the RUs sequentially transmitting a plurality of broadcast signals with power from low to high to generate coverages of radio frequency signals from small to large, so that any of the UEs located within a small coverage of the radio frequency signals detects the RU and establishes connection with the RU.

4. The method as claimed in claim 1, wherein the step of, with respect to each of the UEs, the host device conducting data transmission with the UE in multiple phase delays and calculating an error rate with respect to each of the phase delays includes:
    with respect to each of the UEs, the host device controlling the beamforming antenna of the UE, via said one of the RUs that is connected to the UE, to conduct user datagram protocol (UDP) transmissions in multiple phase delays; and
    the host device calculating block error rate (BLER) with respect to received UDP packet data.

5. The method as claimed in claim 1, wherein each of the high-PHY layers has a random access channel (RACH), a physical uplink control channel (PUCCH), and a physical uplink shared channel (PUSCH) for uplink communication; and wherein the step of one of the high-PHY layers of the DU that is connected to said one of the RUs receiving the uplink data from said one of the RUs and performing decoding on the uplink data thus received includes:
    the PUSCH receiving the uplink data from the RU, carrying the uplink data, and performing decoding on the uplink data thus received.

6. The method as claimed in claim 1, wherein the high-PHY layers have a common RACH and a common PUCCH, and each of the high-PHY [s] layers has a respective PUSCH; and
    wherein the step of one of the high-PHY layers of the DU that is connected to said one of the RUs receiving the uplink data from said one of the RUs and performing decoding on the uplink data thus received includes the PUSCH receiving the uplink data from the RU, carrying the uplink data, and performing decoding on the uplink data thus received.

7. A radio access network (RAN) for communicative connection with a plurality of user equipments (UEs) that have beamforming antennas, the RAN comprising:
    a plurality of radio units (RUs) for connecting with the UEs; and
    a host device for communicative connection with said RUs, including
    a distributed unit (DU) having a plurality of high-PHY layers configured to be connected with said RUs, respectively, and
    a central unit (CU) configured to connect to and manage said DU;
    wherein, with respect to each of the UEs, said host device determines which one of the RUs the UE is to be connected with, and sets, through controlling the UE via one of said RUs that is connected thereto, a configuration of the beamforming antenna of the UE with a specific phase delay, such that the UE and said one of said RUs that is connected thereto form a spatially isolated relationship;
    wherein the specific phase delay is determined by said host device by calculating and finding a lowest error rate of data transmissions; and
    wherein each of said RUs receives uplink data from the UE connected thereto and transmits the uplink data to a respective one of said high-PHY layers of said DU, the respective one of said high-PHY layers performs decoding on the uplink data, and said DU transmits the uplink data thus decoded to said CU.

8. The RAN as claimed in claim 7, wherein said host device receives RACH signals transmitted from the UEs and relayed via said RUs, and determines which one of said RUs each of the UEs is to be connected with, according to signal strengths of the RACH signals.

9. The RAN as claimed in claim 7, wherein each of said RUs transmits a plurality of broadcast signals with power from low to high to generate coverages of radio frequency signals from small to large, so that any of the UEs located within a small coverage of the radio frequency signals detects said RU and establishes connection with said RU.

10. The RAN as claimed in claim 7, wherein, with respect to each of the UEs, said host device controls the beamforming antenna of the UE, via said one of said RUs that is connected to the UE, to conduct user datagram protocol (UDP) transmissions in multiple phase delays, calculates block error rate (BLER) with respect to the UDP packet data received, and sets a configuration of the beamforming antenna of the UE using the phase delay that has the lowest BLER.

11. The RAN as claimed in claim 7, wherein each of said high-PHY layers includes a random access channel (RACH), a physical uplink control channel (PUCCH), and a physical uplink shared channel (PUSCH) for uplink communication; and wherein said PUSCH configured to receive the uplink data from said RU, carry the uplink data, and perform decoding on the uplink data thus received.

12. The RAN as claimed in claim 7, wherein said high-PHY layers have a common RACH and a common PUCCH, and each of said high-PHY layers has a respective PUSCH; wherein said respective PUSCH is configured to receive the uplink data from said RU, carry the uplink data, and perform decoding on the uplink data thus received.

13. A radio access network (RAN) system, comprising the RAN as claimed in claim 7, and the plurality of UEs having beamforming antennas.

* * * * *